(12) United States Patent
Toelle

(10) Patent No.: US 9,267,416 B2
(45) Date of Patent: Feb. 23, 2016

(54) EXHAUST PURIFICATION DEVICE

(71) Applicant: VOLKSWAGEN AKTIENGESELLSCHAFT, Wolfsburg (DE)

(72) Inventor: Stefan Toelle, Konigslutter (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/354,201

(22) PCT Filed: Oct. 6, 2012

(86) PCT No.: PCT/EP2012/004193
§ 371 (c)(1),
(2) Date: Apr. 25, 2014

(87) PCT Pub. No.: WO2013/060414
PCT Pub. Date: May 2, 2013

(65) Prior Publication Data
US 2014/0260220 A1     Sep. 18, 2014

(30) Foreign Application Priority Data

Oct. 27, 2011  (DE) .......................... 10 2011 117 090

(51) Int. Cl.
*F01N 3/24*  (2006.01)
*F01N 13/00*  (2010.01)
(Continued)

(52) U.S. Cl.
CPC .............. *F01N 13/00* (2013.01); *F01N 3/2892* (2013.01); *F01N 13/0097* (2014.06);
(Continued)

(58) Field of Classification Search
CPC ..... F01N 3/0878; F01N 3/2892; F01N 13/00; F01N 13/0097; F01N 13/017; F01N 13/02; F01N 13/04; F01N 2240/20; F01N 2240/36; F01N 2410/00; F01N 2410/12; F01N 2470/02; F01N 2470/08; F01N 2470/24; F01N 2470/30; F01N 1/006; F01N 1/085; F01N 1/086; F01N 1/0878; F01N 1/088; F01N 1/166; F01N 3/031; F01N 2240/18; F01N 2410/03; F01N 2410/06; F01N 2550/10

See application file for complete search history.

(56) References Cited

U.S. PATENT DOCUMENTS 5,582,003 A    12/1996  Patil et al.
5,738,832 A    4/1998   Dogahara et al.
(Continued)

FOREIGN PATENT DOCUMENTS

DE    37 33 402      4/1989
DE    197 09 432     10/1997
(Continued)

OTHER PUBLICATIONS

Machine translation of JP 2000-337135A, accessed Mar. 9, 2015.*
(Continued)

*Primary Examiner* — Jonathan Matthias
(74) *Attorney, Agent, or Firm* — Pearl Cohen Zedek Latzer Baratz LLP

(57) ABSTRACT

The invention relates to an exhaust-gas treatment device (10), comprising a) an outer tube (14) through which an exhaust-gas stream (12) can flow, b) an inner tube (20) that is arranged in a first section (16) of the outer tube (14) and that divides the interior of the first section (16) into a central flow path (22) and a peripheral flow path (24), whereby a first exhaust-gas treatment means (26) is arranged in the central flow path (22) and/or in the peripheral flow path (24), c) means (30, 32) to selectively convey an exhaust-gas stream via the central flow path (22) and/or via the peripheral flow path (24), and d) a second exhaust-gas treatment means arranged in a second section (18) of the outer tube (14) downstream from the first section (16). Flow means (36, 38, 40) are provided that are designed to equalize a flow impinging upon the second exhaust-gas treatment means (28) when the exhaust gas is conveyed via the central flow path (28) as well as when the exhaust gas is conveyed via the peripheral flow path (24).

9 Claims, 6 Drawing Sheets

(51) Int. Cl.
*F01N 3/28* (2006.01)
*F01N 13/02* (2010.01)
*F01N 13/04* (2010.01)

(52) U.S. Cl.
CPC ............. *F01N 13/017* (2014.06); *F01N 13/02* (2013.01); *F01N 13/04* (2013.01); *F01N 2240/20* (2013.01); *F01N 2410/00* (2013.01); *F01N 2470/02* (2013.01); *F01N 2470/08* (2013.01); *F01N 2470/24* (2013.01); *Y02T 10/22* (2013.01)

(56) References Cited

U.S. PATENT DOCUMENTS

| | | | |
|---|---|---|---|
| 5,937,637 | A | 8/1999 | Fujishita et al. |
| 5,966,929 | A | 10/1999 | Socha, Jr. |
| 6,334,304 | B1 | 1/2002 | Machida et al. |
| 6,763,655 | B2 * | 7/2004 | Ueno et al. ........................ 60/277 |
| 2002/0132726 | A1 | 9/2002 | Endo et al. |
| 2003/0046926 | A1 * | 3/2003 | Watanabe ............. F01N 3/0814 60/278 |
| 2005/0220679 | A1 * | 10/2005 | Choi ............................. 422/177 |
| 2006/0123772 | A1 | 6/2006 | Iwamoto et al. |
| 2007/0144158 | A1 * | 6/2007 | Girard ................... F01N 3/2892 60/324 |
| 2008/0098733 | A1 | 5/2008 | Dickerson |
| 2008/0216474 | A1 | 9/2008 | Turner |
| 2009/0064678 | A1 | 3/2009 | Perrin et al. |
| 2010/0139268 | A1 | 6/2010 | Huber et al. |
| 2011/0011060 | A1 | 1/2011 | McCarthy, Jr. |

FOREIGN PATENT DOCUMENTS

| | | |
|---|---|---|
| DE | 198 38 703 | 3/2000 |
| DE | 198 39 754 | 3/2000 |
| DE | 100 21 421 A1 | 2/2002 |
| DE | 102 01 042 | 8/2003 |
| DE | 103 50 516 | 6/2005 |
| DE | 10 2005 012 066 | 9/2006 |
| EP | 0 580 931 | 2/1994 |
| EP | 1 122 413 | 8/2001 |
| EP | 1 152 133 A2 | 11/2001 |
| JP | 2 173 312 | 7/1990 |
| JP | 2000 345 829 | 12/2000 |
| JP | 2000 337135 | 12/2000 |
| JP | 2005 127257 | 5/2005 |

OTHER PUBLICATIONS

International Search Report Issued for PCT International Application No. PCT/EP2012/004193, mailed Jan. 21, 2013.
International Search Report for International Application No. PCT/EP2011/005583, mailed Feb. 24, 2012.
Office Action for U.S. Appl. No. 13/997,617, mailed Jul. 30, 2014.

* cited by examiner

EXHAUST PURIFICATION DEVICE

CROSS-REFERENCE TO RELATED APPLICATIONS

This application is a National Phase Application of PCT International Application No. PCT/EP2012/004193, International Filing Date Oct. 6, 2012, which claims priority from German Patent Application No. 10 2011 117 090.5, filed Oct. 27, 2011, which are hereby incorporated by reference.

FIELD OF THE INVENTION

The invention relates to an exhaust-gas treatment device.

BACKGROUND OF THE INVENTION

The state of the art discloses exhaust-gas treatment devices in which, upstream from an exhaust-gas converter, the exhaust-gas path is divided by an inner tube into a central flow path and a peripheral flow path (e.g. German patent application DE 103 50 516 A). One of these parallel flow paths, especially the peripheral flow path, contains an exhaust-gas treatment means. Suitable actuators serve to convey the exhaust-gas stream through the annular exhaust-gas treatment means via the peripheral flow path or else to bypass the latter via the central flow path. Such an arrangement is known, for example, in conjunction with a downstream three-way catalyst upstream from which there is an adsorber for hydrocarbons (HC adsorber) in one of the parallel flow paths. As long as the main catalyst has not yet reached its operating temperature after the engine has been started, the exhaust-gas stream is conveyed through the peripheral HC adsorber that temporarily stores the hydrocarbons present in the exhaust gas. As soon as the downstream catalyst has reached its operating temperature, the exhaust-gas stream is conveyed via the central flow path so as to bypass the HC adsorber and to heat it up. Once the HC adsorber has reached its desorption temperature, the exhaust gas is once again conveyed partially or completely through the HC adsorber in order to discharge the released hydrocarbons and to transport them into the main catalyst, where they are catalytically converted.

A disadvantage of the arrangement described above is that the exhaust-gas stream impinges upon the downstream main catalyst non-homogeneously and also differently, depending on whether the exhaust gas has been conveyed via the central flow path or via the peripheral flow path. So far, no measures are known that are capable of remedying this problem.

German patent application DE 37 33 402 A relates to the problem of the non-homogeneous flow that reaches a catalyst arranged in an exhaust-gas pipe whose diameter is smaller than that of the catalytic converter. The catalyst substrate is situated in a catalyst housing that is connected to the exhaust-gas pipe via an inlet tube (diffuser) that widens conically in the flow direction of the exhaust gas. In order to homogenize the flow that reaches the catalyst element, several flow baffles that divide the exhaust gas path into several parallel exhaust-gas paths are provided upstream from the catalyst. For instance, the flow baffles can comprise several concentrically arranged plates in the form of truncated cones having an increasing opening angle.

Another approach is proposed by German patent specification DE 198 39 754 B. According to this approach, a baffle element configured as a vane is arranged in the exhaust-gas feed pipe connected to the inlet funnel of the catalyst housing and this baffle element imparts a swirl to the exhaust-gas stream in order to homogenize the flow that reaches the catalyst.

German patent application DE 198 38 703 A deals with the problem of an exhaust-gas flow which displays a strong swirl generated by the turbine of an exhaust-gas turbocharger and which causes a non-homogenous flow to reach the front face of a catalyst located downstream. As a remedy, a baffle in the form of a compressed "8" is arranged in the exhaust-gas pipe.

SUMMARY OF THE INVENTION

The present invention is based on the objective of putting forward an exhaust-gas treatment device of the type described above that can overcome the described flow-related problems involving a main catalyst located upstream from a divided flow path.

The exhaust-gas treatment device according to the invention encompasses the following:
a) an outer tube through which an exhaust-gas stream can flow;
b) an inner tube that is arranged in a first section of the outer tube and that divides the interior of the first section into a central flow path and a peripheral flow path, whereby a first exhaust-gas treatment means is arranged in the central flow path and/or in the peripheral flow path;
c) means to selectively convey an exhaust-gas stream via the central flow path and/or via the peripheral flow path; and
d) a second exhaust-gas treatment means arranged in a second section of the outer tube downstream from the first section.

According to the invention, the exhaust-gas treatment device has flow means that are designed to equalize a flow impinging upon the second (downstream) exhaust-gas treatment means when the exhaust gas is conveyed via the central flow path on the one hand as well as when the exhaust gas is conveyed via the peripheral flow path on the other hand. In other words, this at least reduces differences that occur between the two alternative flow paths in the exhaust gas impinging upon the second exhaust-gas treatment means.

The invention is based on the realization that the problem of a non-homogeneous flow reaching the catalyst—that is to say, different areas of the front face of the catalyst are impinged upon differently, depending on the given flow path—is less pronounced than the difference in the way the catalyst is impinged upon in the two modes of operation, namely, the central and the peripheral exhaust-gas paths. Consequently, the invention is not primarily aimed at attaining that a homogeneous stream flow impinges upon the downstream exhaust-gas treatment means in each of the two modes of operation, but rather, it is aimed at equalizing the flow profiles of the two modes of operation.

In a preferred embodiment of the invention, the flow means comprise a vane that adjoins the outer tube and that, in the manner of a nozzle, narrows the flow cross section in the direction of the inner tube, preferably conically. In this context, the vane can adjoin an end section of the inner tube or else it can adjoin an annular gap situated between it and the end section of the inner tube. In the former case, when the vane adjoins the end section of the inner tube, there is preferably a plurality of passage openings in the end section of the inner tube. In this manner, the exhaust-gas stream conveyed via the peripheral flow path is conveyed through the passage openings of the inner tube. In any case, the vane effectuates a bundling of the exhaust-gas stream that is conveyed via the peripheral flow path, said stream then acquiring a circular cross section and centrally impinging upon the downstream exhaust-gas treatment means. Therefore, this impinging pattern corresponds to the pattern of the central exhaust gas conveyance when the exhaust-gas stream is conveyed through the inner tube via the central flow path.

According to another advantageous embodiment of the invention, the flow means comprise a diffuser having a section that narrows the flow cross section in the area of an end section of the inner tube or else downstream from it as well as an adjoining section that widens the flow cross section. If the diffuser with its section that narrows the flow cross section adjoins the inner tube, the latter preferably once again has passage openings so that the exhaust-gas stream conveyed via the peripheral flow path is conveyed through the passage openings of the inner tube and thus through the diffuser. In an alternative embodiment, the diffuser forms an annular gap between the end section of the inner tube and its section that narrows the flow cross section. In any case, the diffuser widens the exhaust-gas stream that is flowing through, irrespective of whether the stream is being conveyed through the peripheral or the central exhaust-gas path.

In a preferred embodiment of the invention, the vane and the diffuser are configured as a joint component. For instance, this joint component can be configured as a tapered inner tube whose front and rear ends adjoin the outer tube and whose tapered area (the section that narrows the cross section) adjoins the inner tube or forms an annular gap with it.

In an advantageous embodiment of the invention, the diffuser has a coaxially arranged, conically widening flow baffle element that thus divides the flow path into two coaxial flow paths. The flow baffle element is preferably joined to the rest of the diffuser body by means of holding struts. In another embodiment, the holding struts are arranged at a radial angle of inclination, as a result of which the exhaust-gas stream that is passing through is imparted with a swirl.

Advantageously, the first exhaust-gas treatment means is arranged in the peripheral flow path and it has an annular shape. This embodiment is advantageous whenever there is a need for a cooling effect over the outer tube of the exhaust-gas treatment device. This is the case, for example, when the first exhaust-gas treatment means is an HC adsorber that is only capable of storing hydrocarbons until it has reached its desorption temperature.

If the first exhaust-gas treatment means is not an adsorber but rather a converter, then its arrangement in the inner tube can be advantageous in order to heat the converter to its light-off temperature as quickly as possible and to then maintain it at this temperature.

The second exhaust-gas treatment means advantageously can be an oxidation or three-way catalyst that catalytically converts hydrocarbons contained in the exhaust gas.

Additional advantageous embodiments of the invention are the subject matter of the other subordinate claims.

BRIEF DESCRIPTION OF THE DRAWINGS

The invention will be explained in greater detail below on the basis of embodiments. The following is shown.

DETAILED DESCRIPTION OF THE INVETNION

Figure 1B:
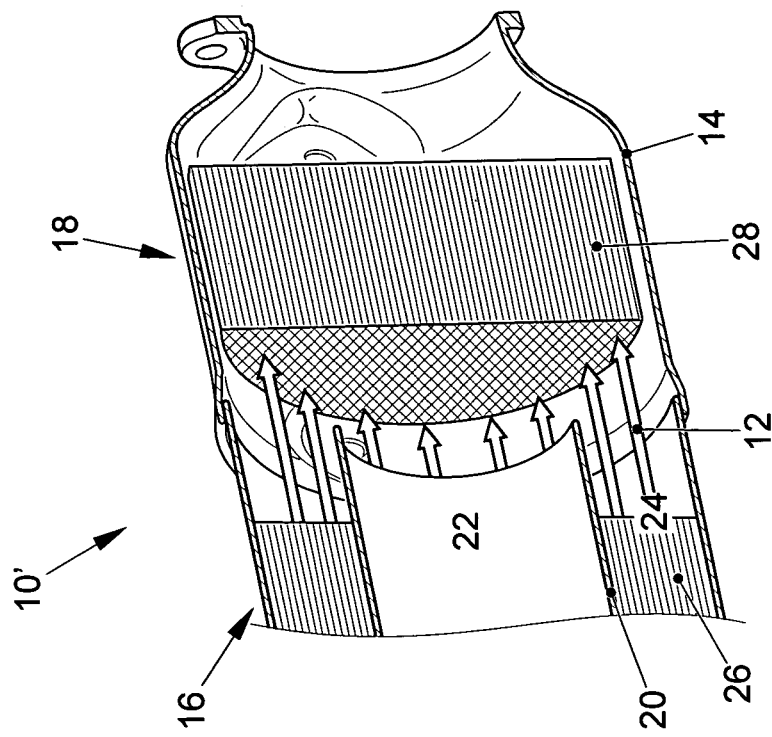
FIG. 1 a sectional view of an exhaust-gas treatment device according to the state of the art (A) in a first mode of operation with a central flow, and (B) in a second mode of operation with a peripheral flow.

The exhaust-gas treatment device 10' shown in FIG. 1 comprises an outer tube 14 through which an exhaust-gas stream (indicated with the reference numeral 12) can flow and which has a first upstream section 16 and a second downstream section 18. The outer tube can be a single piece or, as shown, can consist of several parts. In the upstream section 16, there is an inner tube 20 which is especially arranged coaxially to the outer tube 14 and which divides the interior of the first section 16 into a central flow path 22 and a peripheral, annular flow path 24.

A first annular exhaust-gas treatment means 26 is arranged in the peripheral flow path 24. A second exhaust-gas treatment means 28 is arranged in the second section 18 of the outer tube 14 downstream from the first exhaust-gas treatment means 26. The first annular exhaust-gas treatment means 26 can be, for instance, an HC adsorber, while the downstream second exhaust-gas treatment means 28 can be an oxidation or three-way catalyst.

As long as the three-way catalyst 28 has not yet reached its operating temperature, for example, after the engine has been started, the exhaust-gas stream 12 is at first conveyed through the HC adsorber 26 (see FIG. 1B) via the peripheral flow path 24. The exhaust-gas stream 12 has an annular cross section when it exits the peripheral flow path 24 and, in this shape, it strikes the downstream three-way catalyst 28. During this operating phase, the hydrocarbons are retained in the HC adsorber 26, while the hot exhaust gas heats up the catalyst 28. As soon as the catalyst has reached its operating temperature, the exhaust-gas stream 12 is conveyed via the central flow path 22 while bypassing the HC adsorber 26 (see FIG. 1A). The hydrocarbons contained in the exhaust gas are then catalytically converted in the three-way catalyst 28. During this phase, the HC adsorber 26 is further heated up by the hot exhaust gas that is flowing through the inner tube 20. In this mode of operation, the exhaust-gas stream 12 leaves the inner tube 20 in the form of a compact central flow having a circular cross section and, in this shape, it strikes the catalyst 28. In this case, the stream only impinges upon a central area of the second exhaust-gas treatment means 28. Once the HC adsorber 26 has reached a temperature at which the stored hydrocarbons desorb, the exhaust-gas stream 12 is once again conveyed partially or completely via the peripheral flow path 24 in order to discharge the hydrocarbons from the adsorber 26 and to feed them to the downstream catalyst 26 [sic], where they are catalytically converted.

Figure 1A:
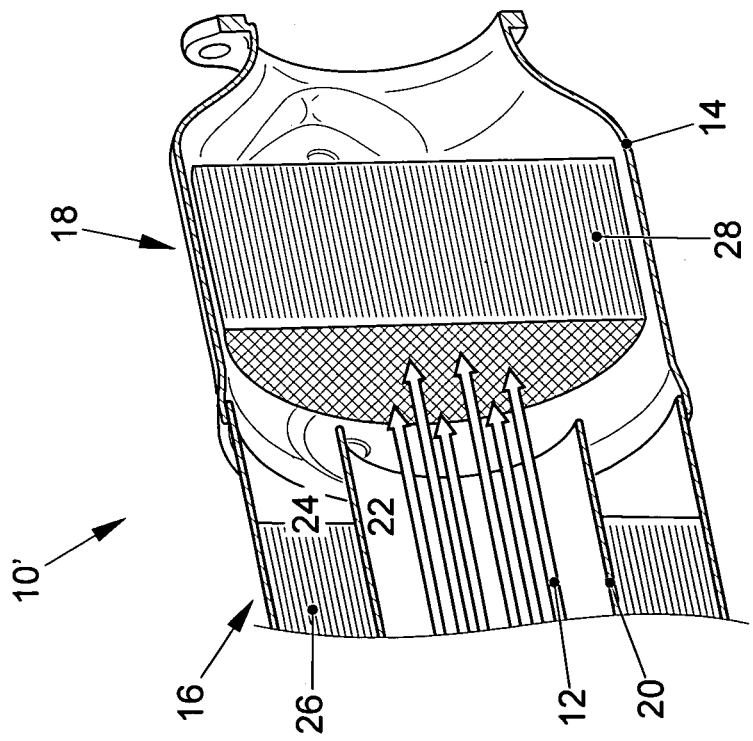

A comparison of FIGS. 1A and 1B shows that, depending on the flow path of the exhaust gas, the exhaust-gas stream 12 impinges upon the second exhaust-gas treatment means 28 not only in a non-homogenous manner but also very differently. Whereas in the case of the central exhaust-gas conveyance only the central area of the exhaust-gas treatment means 28 is impinged upon, in the case of the peripheral exhaust-gas conveyance, the exhaust-gas stream strikes mainly the outer areas of the exhaust-gas treatment means 28. This gives rise to non-homogenous and fluctuating temperature distributions in the catalyst 28, which shortens its lifetime. Moreover, the lifetime of the catalyst 28 is also shortened in that only small partial areas are stressed but, as a result, more intensely. In the above-mentioned example of the combination of an annular HC adsorber 26 with a downstream three-way catalyst 28, another detrimental factor is that the exhaust-gas stream exiting the HC adsorber 26 has to strike a hot catalyst 28 in order to ensure a sufficient conversion of the hydrocarbons. However, if prior to that, only the central areas of the three-way catalyst 28 are impinged upon and heated up, then it can also happen that the edge area of the three-way catalyst 28 has likewise not yet heated up sufficiently when the exhaust-gas stream is switched over to the peripheral flow path 24.

In order to overcome the problems described above, flow means are provided according to the invention which bring about an equalization between the two modes of operation for the exhaust gas that impinges upon the second exhaust-gas treatment means 28. Various embodiments of the exhaust-gas treatment device according to the invention are shown in FIGS. 2 to 6, whereby the same reference numerals as in FIG. 1 are used for corresponding elements whose function will not be explained here in detail again.

Figure 2A:
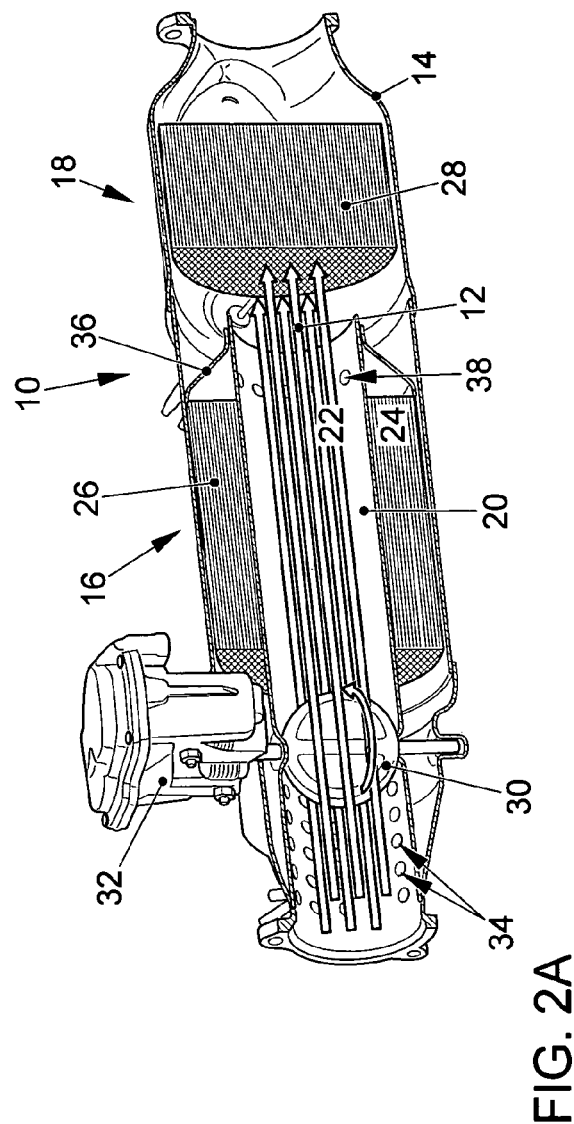
FIG. 2 a sectional view of an exhaust-gas treatment device according to a first embodiment of the invention (A) in a first mode of operation with a central flow, and (B) in a second mode of operation with a peripheral flow.
Figure 2B:
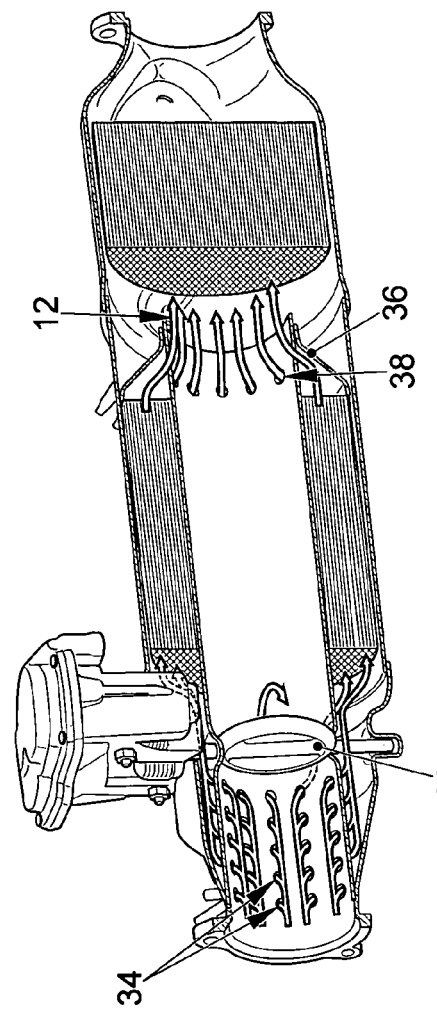

FIG. 2 shows a first embodiment of an exhaust-gas treatment device according to the present invention. In addition to what is shown in FIG. 1, means are also shown here that selectively convey the exhaust-gas stream 12 via the central flow path 22 and/or via the peripheral flow path 24. These means comprise an actuator 30 which, in the present example, is an exhaust-gas flap that is mounted in the inner tube so that it can rotate around a central shaft. The exhaust-gas flap 30 is actuated by means of a servomotor 32. If the exhaust-gas flap 30 is open, the exhaust-gas stream 12 flows through the inner tube 20 (central exhaust-gas conveyance, FIG. 2A). If, in contrast, the exhaust-gas flap 30 is rotated by 90°, the inner tube 20 is closed and the exhaust-gas stream 12 flows through passage openings 34 provided in a front section of the inner tube 20 and enters the peripheral flow path 24, so that the exhaust-gas stream is conveyed through the first exhaust-gas treatment means 26 (peripheral exhaust-gas conveyance, FIG. 2B).

In the presented embodiment of the invention, there is a flow means in the form of a vane 36 which adjoins the outer tube 14 downstream from the first exhaust-gas treatment means 26 and whose other end adjoins an end section of the inner tube 20. Moreover, in the end section of the inner tube 20, there are passage openings 38 that are distributed along the circumference of the inner tube 20. If the exhaust-gas stream 12 is then conveyed via the peripheral flow path 24 through the first exhaust-gas treatment means 26, the vane 36 forces the exhaust-gas stream through the passage openings 38 of the inner tube 20. The exhaust-gas stream 12 is thus centrally bundled and, with a circular cross section, it strikes the downstream exhaust-gas treatment means 28. The flow profile of the second exhaust-gas treatment means 28 is thus similar to the case depicted in FIG. 2A when the exhaust gas is conveyed via the central flow path 22. Even though in both cases, the exhaust-gas stream 12 reaches mainly the central area of the exhaust-gas treatment means 28, this takes place almost identically for both modes of operation. As a result, temperature fluctuations over time in the catalyst 28 are prevented and it is also ensured that the exhaust gas that is conveyed through the annular catalyst 26 strikes a hot and thus operationally ready area of the downstream catalyst 28.

Figure 3:
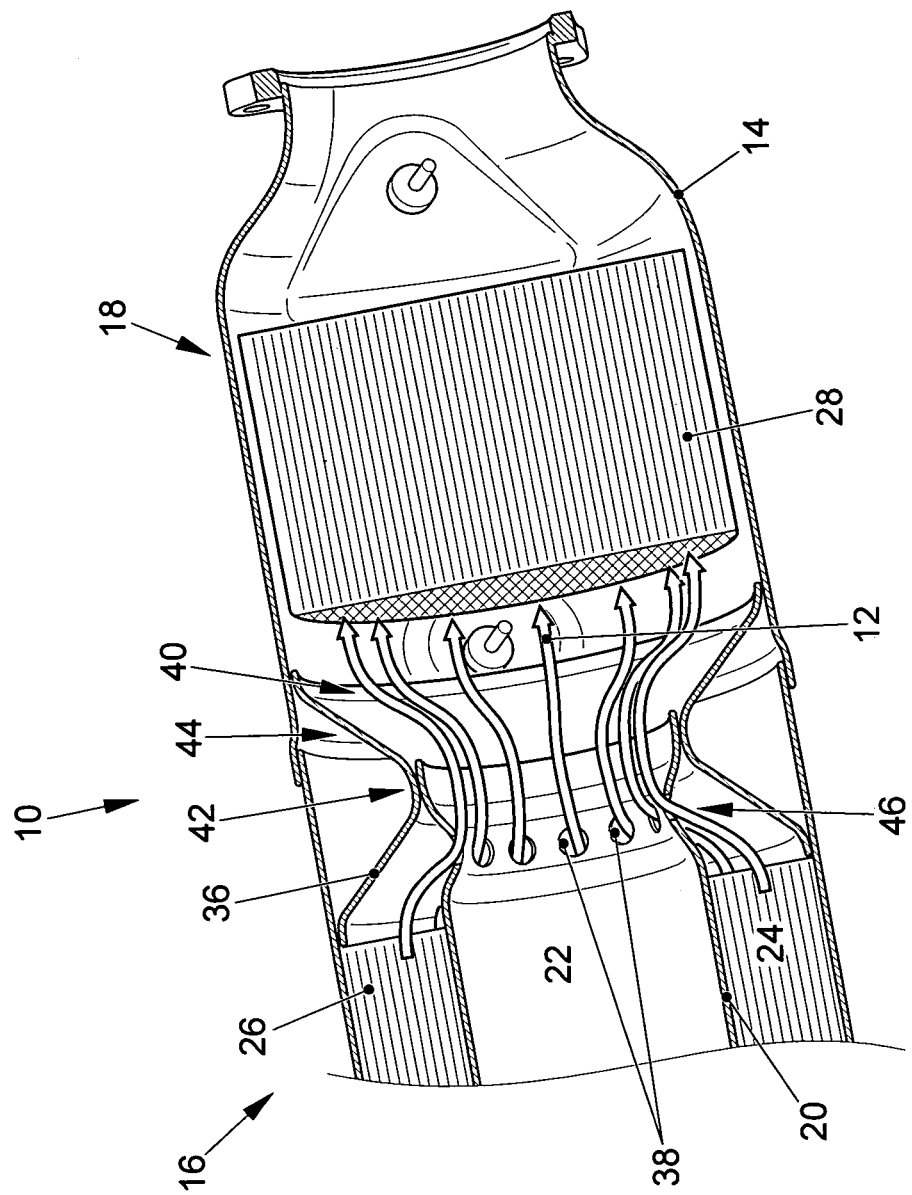
FIG. 3 a sectional view of an exhaust-gas treatment device according to a second embodiment of the invention, with a peripheral flow.

Another embodiment of an exhaust-gas treatment device 10 according to the invention is shown in FIG. 3, whereby all that is depicted here is the mode of operation in which the exhaust gas is conveyed via the peripheral flow path 24.

In this embodiment, the flow means according to the invention comprise not only the vane 36 and the passage openings 38 in the inner tube 20 but also a diffuser 40. The diffuser 40 has a section 42 that narrows the flow cross section and that is located in the area of the end section of the inner tube 20 so as to adjoin the inner tube 20. Adjoining the section 42, there is a section 44 which widens the flow cross section conically and which adjoins the outer tube 14. In the example shown, the vane 36 and the diffuser 40 are configured as a joint component. Therefore, said component consists of a pipe that is arranged in an outer tube 14 and that has a central tapering (the section 42 which narrows the flow cross section), whereby the two ends are each in contact with the outer tube 14, for instance, they are welded to it.

The diffuser widens the exhaust-gas stream 12 homogeneously so that it strikes the exhaust-gas treatment means 28 with a circular cross section very homogenously and over a larger area than is the case without a diffuser (see FIGS. 2B and 3). Such a flow profile is obtained in those cases when the exhaust-gas stream is conveyed through the inner tube 20 (central flow path 22). Thus, also in this embodiment, the exhaust-gas stream impinges upon the downstream exhaust-gas treatment means 28 in a very similar way.

An even better homogenization of the exhaust-gas stream is achieved if the inner tube 20 has a constriction 46 in the area of its passage openings 38, as shown in FIG. 3.

Figure 4A:
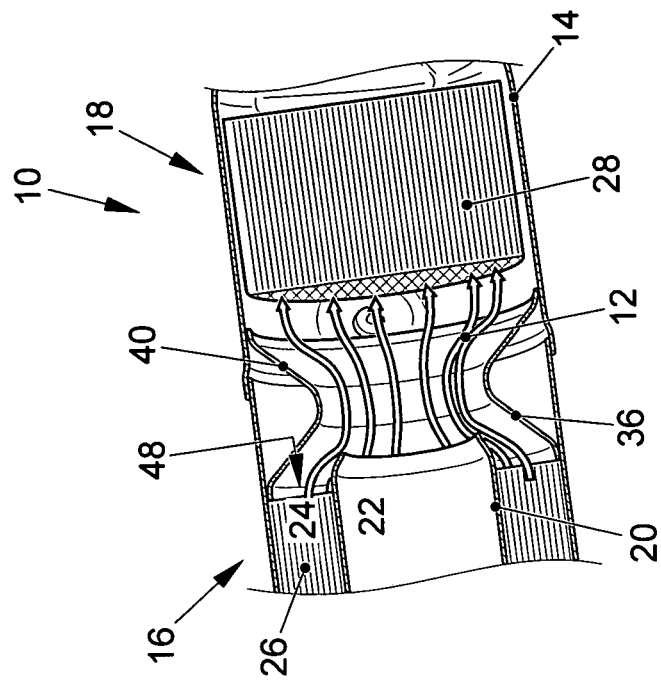
FIG. 4 a sectional view of an exhaust-gas treatment device according to a third embodiment of the invention, (A) in a first mode of operation with a central flow, and (B) in a second mode of operation with a peripheral flow.
Figure 4B:
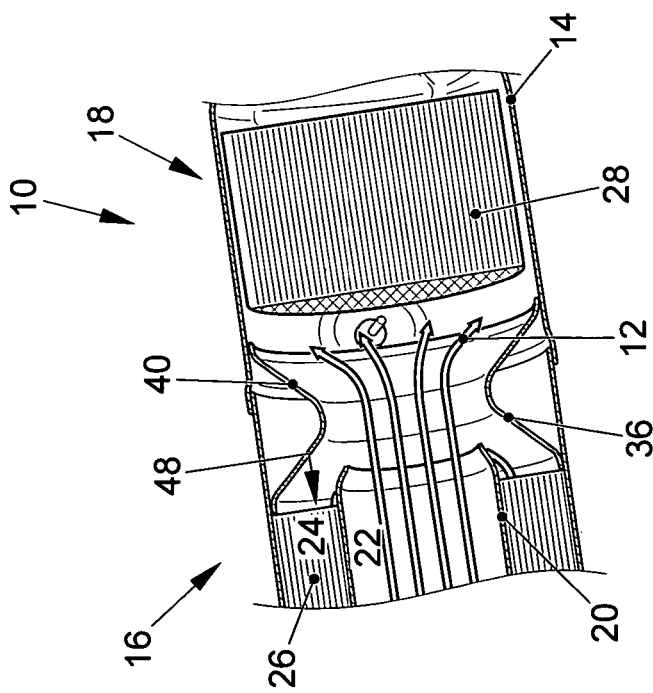

FIG. 4 shows another embodiment in the form of an exhaust-gas treatment device 10 according to the invention, whereby FIG. 4A depicts the device with a central exhaust-gas conveyance and FIG. 4B depicts the device with a peripheral exhaust-gas conveyance.

In contrast to the embodiments presented above, according to FIG. 4, the vane 36 does not adjoin the end section of the inner tube 20, but rather, it forms an annular gap 48 with it. In this embodiment, it is possible to dispense with the passage openings in the end section of the inner tube 20. Like in the embodiment variant shown in FIG. 3, here, too, the vane 36 and the diffuser 40 form a joint component.

With the central exhaust-gas conveyance through the inner tube 20 and with the peripheral exhaust-gas conveyance through the annular exhaust-gas treatment means 26, the exhaust-gas stream strikes the downstream catalyst 28 with a circular distribution (see FIGS. 4A and 4B).

Figure 5:
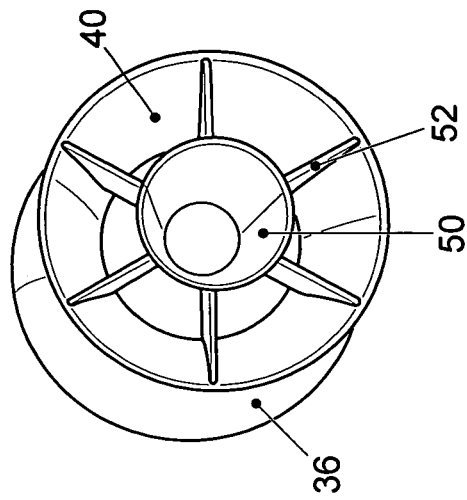
FIG. 5 a sectional view of an exhaust-gas treatment device according to a fourth embodiment of the invention, with a peripheral flow, and a perspective detailed view of the flow means.
Figure 5:
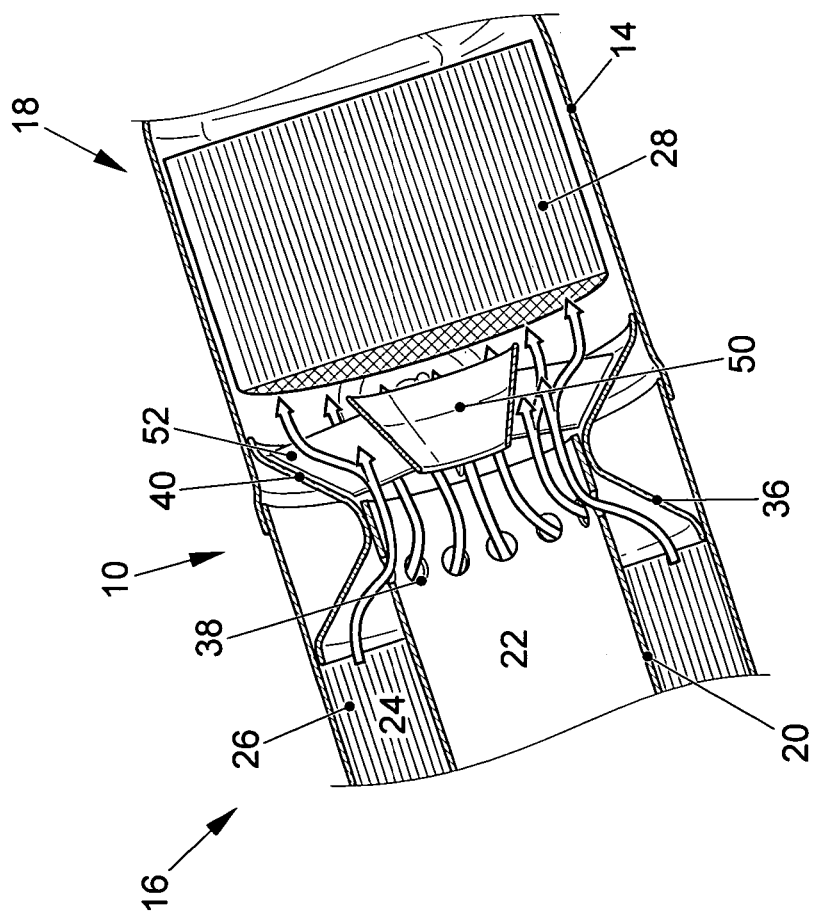
Figure 6:
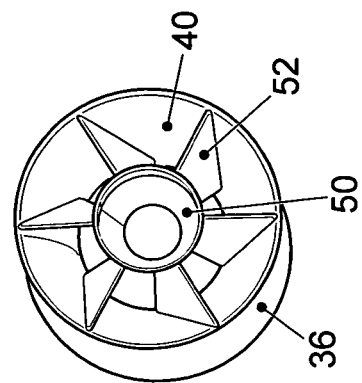
FIG. 6 a sectional view of an exhaust-gas treatment device according to a fifth embodiment of the invention, with a peripheral flow, and a perspective detailed view of the flow means.
Figure 6:
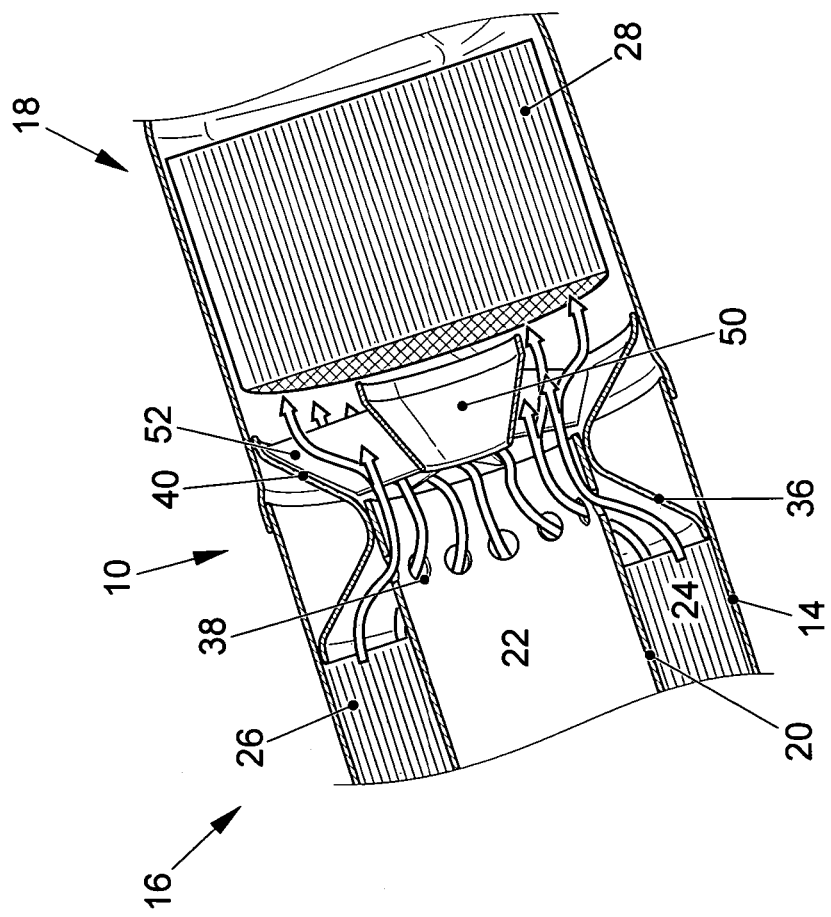

FIGS. 5 and 6 show variants of the embodiment shown in FIG. 3, whereby only the peripheral exhaust-gas conveyance is depicted in each case.

In these embodiment variants, the diffuser 40 is also fitted with a coaxially arranged flow baffle element 50 in the form of a truncated cone that widens conically in the flow direction. The flow baffle element 50 is held in the diffuser 40 by a plurality of radially arranged holding struts 52. Therefore, in this embodiment, the flow baffle elements, namely the vane 36, the diffuser 40 and the flow baffle element 50, as well as the holding struts 52 are configured as a joint component, which is shown in the perspective views of FIGS. 5 and 6.

The flow baffle element 50 brings about an additional homogenization of the exhaust-gas stream that strikes the downstream exhaust-gas treatment means 28.

The flow baffle elements according to the invention shown in FIGS. 5 and 6 differ in the arrangement of the holding struts 52 in that the latter are not arranged strictly parallel to the direction of flow as depicted in FIG. 6, but rather, they have a slanted arrangement with respect to the direction of flow. In this manner, the exhaust-gas stream 12 is imparted with a swirl which translates into a further improvement of the homogenization.

LIST OF REFERENCE NUMERALS 10 exhaust-gas treatment device
12 exhaust-gas stream
14 outer tube
16 first section
18 second section
20 inner tube
22 central flow path
24 peripheral flow path
26 first exhaust-gas treatment means/HC adsorber
28 second exhaust-gas treatment means/three-way catalyst
30 actuator/exhaust-gas flap
32 servomotor
34 passage openings
36 vane
38 passage openings
40 diffuser
42 section that narrows the flow cross section
44 section that widens the flow cross section
46 constriction
48 annular gap
50 flow baffle element
52 holding strut

The invention claimed is:

1. An exhaust-gas treatment device, comprising:
an outer tube configured to convey a flow of exhaust-gas;
an inner tube arranged in a first section of the outer tube, said inner tube dividing an interior of the first section into a central flow path and a peripheral flow path, wherein a first exhaust-gas treatment means is arranged in the peripheral flow path;
an actuator configured to selectively convey the flow of exhaust-gas through the central flow path and/or through the peripheral flow path, the actuator comprising an exhaust-gas flap mounted in the inner tube;
a second exhaust-gas treatment means arranged in a second section of the outer tube downstream from the first section; and
a flow means located at a downstream end of the inner tube, said flow means comprising:
a vane having a first end adjoining the outer tube downstream from the first exhaust gas treatment means that narrows the flow cross section,
a plurality of passage openings in the downstream end of the inner tube and
a diffuser adjoining the vane that widens the flow cross section,
wherein the inner tube has a constriction in the area of the plurality of passage openings that narrows the inner tube flow cross section and
wherein the inner tube flow cross section widens downstream of the constriction.

2. The exhaust-gas treatment device according to claim 1, wherein the vane has a second end adjoining the downstream end of the inner tube downstream from the passage openings, so that the exhaust-gas stream conveyed via the peripheral flow path is conveyed through the passage openings of the inner tube.

3. The exhaust-gas treatment device according to claim 2, wherein the vane narrows conically, towards the inner tube, the flow of exhaust-gas from the peripheral flow path.

4. The exhaust-gas treatment device according to claim 2, wherein the vane and the diffuser are configured as a joint component.

5. The exhaust-gas treatment device according to claim 1, wherein the vane and the diffuser are configured as a joint component.

6. The exhaust-gas treatment device according to claim 1, wherein the first exhaust-gas treatment means has an annular shape.

7. The exhaust-gas treatment device according to claim 1, wherein the first exhaust-gas treatment means is an HC adsorber.

8. The exhaust-gas treatment device according to claim 1, wherein the second exhaust-gas treatment means is an oxidation or three-way catalyst.

9. The exhaust-gas treatment device according to claim 1, wherein the vane narrows conically, towards the inner tube, the flow of exhaust-gas from the peripheral flow path.

* * * * *